US011166259B2

(12) United States Patent
Rao et al.

(10) Patent No.: US 11,166,259 B2
(45) Date of Patent: Nov. 2, 2021

(54) INFORMATION BROADCASTING METHOD AND SYSTEM

(71) Applicant: SZ DJI TECHNOLOGY CO., LTD., Shenzhen (CN)

(72) Inventors: Xiongbin Rao, Shenzhen (CN); Ming Gong, Shenzhen (CN); Xingsen Lin, Shenzhen (CN); Naibo Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 144 days.

(21) Appl. No.: 16/691,086

(22) Filed: Nov. 21, 2019

(65) Prior Publication Data

US 2020/0092847 A1 Mar. 19, 2020

Related U.S. Application Data

(63) Continuation of application No. PCT/CN2017/086607, filed on May 31, 2017.

(51) Int. Cl.
*H04W 72/00* (2009.01)
*H04W 72/04* (2009.01)
(Continued)

(52) U.S. Cl.
CPC ......... *H04W 72/005* (2013.01); *B64C 39/024* (2013.01); *H04W 24/08* (2013.01); *H04W 72/0446* (2013.01)

(58) Field of Classification Search
CPC .......... H04W 72/005; H04W 72/0446; H04W 24/08; B64C 39/024
See application file for complete search history.

(56) References Cited

U.S. PATENT DOCUMENTS 7,424,029 B1   9/2008  Shum
2013/0147652 A1   6/2013  Haque et al.
(Continued)

FOREIGN PATENT DOCUMENTS

CN   103609164 A   2/2014
CN   104604321 A   5/2015
(Continued)

OTHER PUBLICATIONS

Luis Ramos Pinto et al., 'Aerial Video Stream over Multi-hop Using Adaptive TDMA Slots', Dec. 5-8, 2017, IEEE Real-Time Systems Symposium, pp. 1-12. (Year: 2017).*
(Continued)

*Primary Examiner* — Melvin C Marcelo
(74) *Attorney, Agent, or Firm* — Anova Law Group, PLLC (57) ABSTRACT

A monitoring information broadcasting method includes determining a series of transmission sessions aligned to a system time of a mobile platform. Each transmission session includes a first time period and a second time period. The first time period includes a plurality of first time slices and the second time period includes a plurality of second time slices. The method further includes performing one of broadcasting a data packet of a first type during a first active slice among the first time slices in the first time period of one of the transmission sessions or broadcasting a data packet of a second type during a second active slice among the second time slices in the second time period of the one of the transmission sessions.

20 Claims, 6 Drawing Sheets

(51) Int. Cl.
  *H04W 24/08* (2009.01)
  *B64C 39/02* (2006.01)

(56) References Cited

U.S. PATENT DOCUMENTS

| | | | |
|---|---|---|---|
| 2016/0140852 A1 | 5/2016 | Downey et al. | |
| 2017/0132943 A1 | 5/2017 | Moon et al. | |
| 2017/0325221 A1* | 11/2017 | Jalali | H04W 36/0085 |
| 2018/0097560 A1* | 4/2018 | Jalali | H04B 7/18504 |
| 2020/0357287 A1* | 11/2020 | Collins | G08G 5/0069 |
| 2021/0160822 A1* | 5/2021 | Hassan | H04W 4/90 |

FOREIGN PATENT DOCUMENTS

| | | |
|---|---|---|
| CN | 105353341 A | 2/2016 |
| CN | 105554842 A | 5/2016 |
| CN | 105580290 A | 5/2016 |
| CN | 105676856 A | 6/2016 |
| CN | 106257944 A | 12/2016 |
| CN | 106464342 A | 2/2017 |
| CN | 106656307 A | 5/2017 |
| EP | 1630765 A1 | 3/2006 |
| JP | 2015526984 A | 9/2015 |
| JP | 2017504247 A | 2/2017 |
| WO | 2013159304 A1 | 10/2013 |
| WO | 2015095580 A1 | 6/2015 |
| WO | 2016026128 A1 | 2/2016 |
| WO | 2016154949 A1 | 10/2016 |

OTHER PUBLICATIONS

The World Intellectual Property Organization (WIPO) International Search Report and Written Opinion for PCT/CN2017/086607 dated Feb. 26, 2018 6 pages.

Yeniceri Ramazan, et al., Enabling Centralized UTM Services through Cellular Network for VLL UAVs, 2017 Integrated Communications, Navigation and Surveillance Conference (ICNS), IEEE, Apr. 18, 2017.

* cited by examiner

INFORMATION BROADCASTING METHOD AND SYSTEM

CROSS-REFERENCE TO RELATED APPLICATION

This application is a continuation of International Application No. PCT/CN2017/086607, filed May 31, 2017, the entire content of which is incorporated herein by reference.

TECHNICAL FIELD

The present disclosure generally relates to unmanned aerial vehicles monitoring and, more particularly, to methods, systems, and media for broadcasting monitoring information of unmanned aerial vehicle.

BACKGROUND

In recent years, unmanned aerial vehicles (UAVs) have become increasingly popular. Besides bringing a new experience to consumers, UAVs may also cause some potential risks to society, or endanger public safety, etc. For example, unmanned aerial vehicles may invade private properties or intrude on personal privacy. As another example, unmanned aerial vehicles may fly into restricted areas, such as national military regions. As such, there is a need for an effective communication mechanism for monitoring and regulating UAVs.

SUMMARY

In accordance with the disclosure, there is provided a monitoring information broadcasting method includes determining a series of transmission sessions aligned to a system time of a mobile platform. Each transmission session includes a first time period and a second time period. The first time period includes a plurality of first time slices and the second time period includes a plurality of second time slices. The method further includes performing one of broadcasting a data packet of a first type during a first active slice among the first time slices in the first time period of one of the transmission sessions or broadcasting a data packet of a second type during a second active slice among the second time slices in the second time period of the one of the transmission sessions.

Also in accordance with the disclosure, there is provided a monitoring information broadcasting device including a hardware processor, a memory, and a transmitter. The memory stores program codes that, when executed by the hardware processor, cause the hardware processor to determine a series of transmission sessions aligned to a system time of a mobile platform. Each transmission session includes a first time period and a second time period. The first time period includes a plurality of first time slices and the second time period includes a plurality of second time slices. The program codes further cause the hardware processor to generate an instruction for broadcasting information during the transmission sessions. The instruction instructs to broadcast a data packet of a first type during a first active slice among the first time slices in the first time period of one of the transmission sessions or a data packet of a second type during a second active slice among the second time slices in the second time period of the one of the transmission sessions. The transmitter is configured to broadcast information according to the instruction.

Also in accordance with the disclosure, there is provided a monitoring information broadcasting method includes determining a system time for a mobile platform according to a timing signal and determining a series of transmission sessions aligned to the system time. Each transmission session includes a first time period and a second time period. The first time period includes a plurality of first time slices and the second time period includes a plurality of second time slices. The method further includes broadcasting a data packet of a first type during a first active slice of the first time slices in the first time period of a first one of the transmission sessions, broadcasting a data packet of a second type during a second active slice of the second time slices in the second time period of a second one of the transmission sessions, and suspending broadcasting during inactive ones of the first time slices in the first time period of the first one of the transmission sessions, the second time period of the first one of the transmission sessions, the first time period of the second one of the transmission sessions, and inactive ones of the second time slices in the second time period of the second one of the transmission sessions.

BRIEF DESCRIPTION OF THE DRAWINGS

Various objects, features, and advantages of the disclosure can be more fully appreciated with reference to the following detailed description of embodiments when considered in connection with the drawings, in which like reference numerals identify like elements unless otherwise specified. It should be noted that the drawings are merely examples for illustrative purposes according to various disclosed embodiments and are not intended to limit the scope of the present disclosure.

DETAILED DESCRIPTION

Exemplary embodiments of the disclosure will be described in more detail below with reference to the drawings. The described embodiments are some but not all of the embodiments of the present disclosure. Based on the disclosed embodiments, persons of ordinary skill in the art may derive other embodiments consistent with the present disclosure, all of which are within the scope of the present disclosure.

Existing UAV communication mechanisms usually include a point-to-point communication, which includes a non-synchronous system. Thus, regulation of UAVs may require multiple accesses. The present disclosure provides methods, systems, and media for broadcasting information, such as monitoring information.

In accordance with various embodiments, the disclosed methods, systems, and media can realize monitoring information communications for multiple-mobile-platform surveillance. In addition, the present disclosure also provides a design criteria of a set of parameters corresponding to an assignment of time slices to reduce collision probabilities of multiple supervised signals transmitted by multiple mobile platforms.

The disclosed methods, systems, and media can be applicable to any suitable mobile platform for unmanned surveillance. For example, the disclosed methods, systems, and media can be applied to an unmanned aerial vehicle (UAV), an autonomous vehicle, an unmanned ship, etc. As another example, the disclosed methods, systems, and media can be applied to a mobile phone, a tablet computer, a smart wearable device, etc. In the following description, multiple unmanned aerial vehicles (UAVs) are used as examples of the mobile platforms to demonstrate the disclosure methods, systems and media for broadcasting information.

Figure 1:
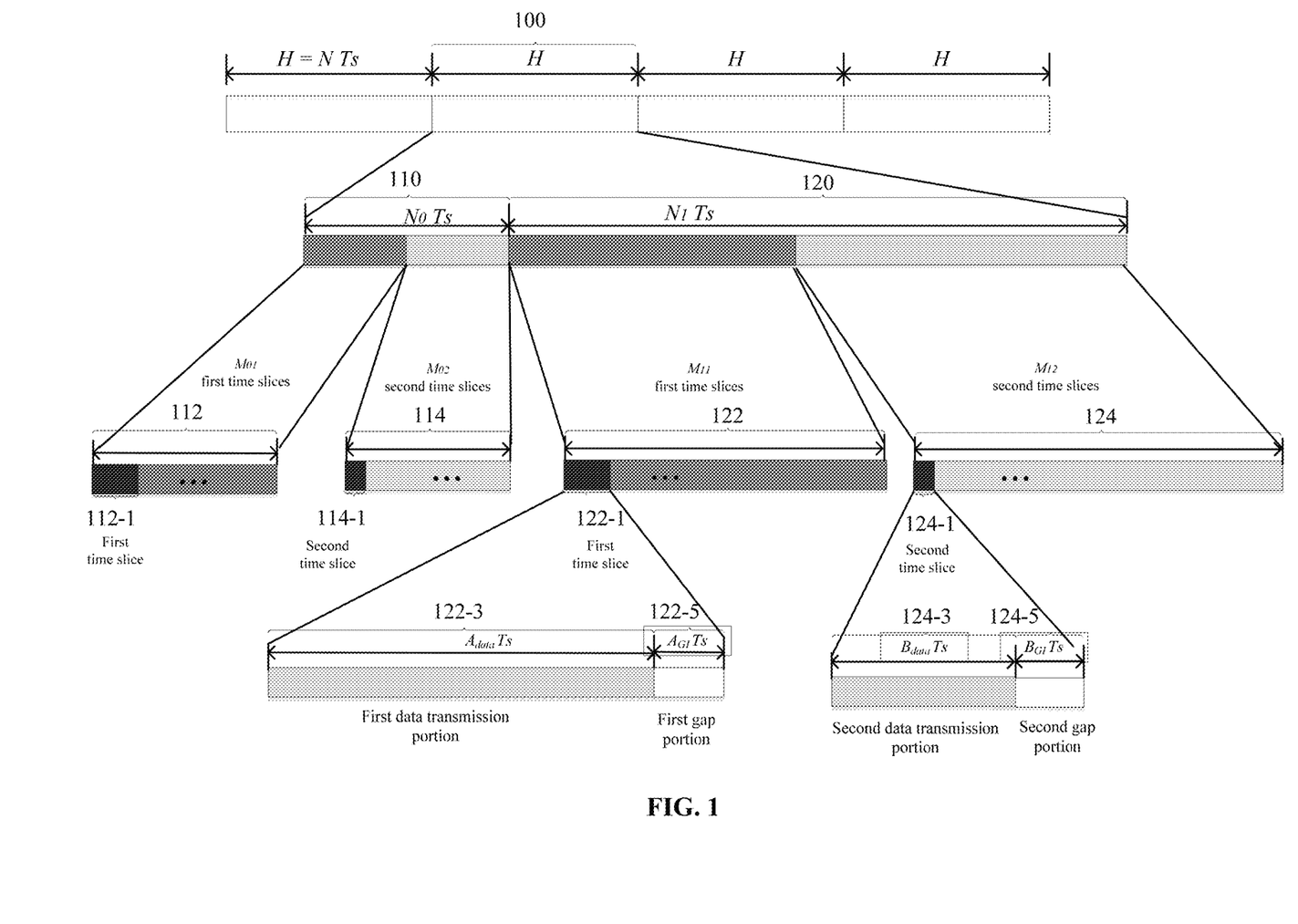
FIG. 1 illustrates a schematic diagram of an exemplary time segment division structure for broadcasting monitoring information of unmanned aerial vehicles in accordance with some embodiments of the disclosure.

FIG. 1 illustrates a schematic diagram of an exemplary time segment division structure for broadcasting information of unmanned aerial vehicles in accordance with some embodiments of the disclosure. The information can be, for example, monitoring information.

A UAV can be associated with a system time for coordinating operations of different components of the UAV. As shown in FIG. 1, the system time can be divided into a plurality of transmission time intervals (TTIs) 100 each having a time length of H. Each TTI can be further divided into a plurality of time units each having a time length of $T_S$. Assuming that each TTI includes a number N of time units $T_S$, each time unit thus equals H/N seconds, with N being a positive integer.

Generally, UAVs can be categorized into a plurality of different types. In some embodiments, in each TTI, the plurality of time units $T_S$ can be divided into two or more groups of successive time units. Each group of successive time units can form a transmission session, also referred to as a "channel time," that can be assigned to a corresponding type of UAVs. In some embodiments, each TTI can include a same number of transmission sessions to correspond to various types of UAVs for communication. As such, every type of UAVs can have an exclusive transmission session in a TTI for broadcasting information, such as monitoring information. Therefore, different types of UAVs would not conflict with each other when broadcasting information.

For example, UAVs may be categorized into two types, i.e., special type UAVs and normal type UAVS. The special type UAVs may include, for example, UAVs for governmental uses, such as military UAVs, police department UAVs, fire department UAVs, etc. The normal type UAVs may include, for example, UAVs for various civil uses, such as commercial UAVs, entertainment UAVs, etc. The description below uses the scenario involving two types of UAVs as an example but can be generalized to scenarios involving more than two types of UAVs.

In the scenario that two types of UAVs are involved, each TTI can include two transmission sessions, i.e., a first transmission session 110 and a second transmission session 120, as shown in FIG. 1. The first transmission session 110 includes former $N_0$ time units $T_S$, and the second transmission session 120 includes later $N_1=N+N_0$ of time units $T_S$, where $N_0$ and $N_1$ are positive integers and $N_0+N_1=N$. The first transmission session 110 may be assigned to the special type UAVs for communication, and the second transmission session 120 may be assigned to the normal type UAVs for communication.

In some embodiments, UAVs may also be categorized into any other suitable number of types, and each TTI can include a same number of transmission sessions to correspond to various types of UAVs for communication. For example, all UAVs can be categorized into one type and thus the TTI does not need to be divided into multiple transmission sessions. That is, one TTI can include one transmission session. As another example, the UAVs can be categorized into three or more types and the TTI can correspondingly be divided into three or more transmission sessions.

In some embodiments, a UAV can transmit the information in data packets. In some embodiments, the UAV can transmit two types of data packet, i.e., a long data packet and a short data packet. The long data packet, also referred to as a "data packet of a first type" or a "type-I data packet," may include, e.g., monitoring data of the UAV, and the short data packet, also referred to as a "data packet of a second type" or a "type-II data packet," may include updating monitoring data of the UAV. The monitoring data in the long data packet may include more complete or full information regarding the UAV, and may also be referred to as "full monitoring data." On the other hand, the updating monitoring data in the short data packet may indicate a change of monitoring data of the UAV between an earlier time point (first time point) and a later time point (second time point). In some embodiments, the updating monitoring data may include incremental monitoring data indicating a change of monitoring data of the UAV between two consecutive time points at which information is broadcast.

In some embodiments, the first time point can be a time point when or before a last data packet, which can be either a long data packet or another short data packet, is broadcast and the second time point can be a time point when or before the current short data packet is broadcast. That is, the updating monitoring data in the short data packet may indicate a change of monitoring data with respect to the monitoring data contained in the last data packet, no matter whether the last data packet is a long data packet or a short data packet.

In some other embodiments, the first time point can be a time point when or before a last long data packet is broadcast and the second time point can be the time point when or before the current short data packet is broadcast. That is, the updating monitoring data in the short data packet may indicate a change of monitoring data of the UAV with respect to the monitoring data contained in the last long data packet, no matter whether the last long data packet is the last data packet broadcast before the current short data packet.

For example, the long data packet may include platform information regarding the UAV and the short data packet may include updating platform information regarding the UAV. The updating platform information may indicate a change of the platform information between the first time point and the second time point. One or both of the long data packet and the short data packet may also include other suitable information of the UAV, such as identity information of the UAV or security information of the UAV.

In some embodiments, the platform information can include real-time location information indicating a position of the UAV. Correspondingly, the updating platform information can include location-changing information of the UAV. The location-changing information may indicate a displacement of the UAV with respect to the position of the UAV at the first time point.

In some embodiments, the real-time location information may include at least one of real-time latitude information indicating a latitude of the UAV, real-time longitude information indicating a longitude of the UAV, real-time altitude information indicating an altitude of the UAV, or real-time height information indicating a height of the UAV. Correspondingly, the location-changing information may include at least one of real-time latitude-changing information indicating a difference of latitude between a current latitude of the UAV and the latitude of the UAV at the first time point, real-time longitude-changing information indicating a difference of longitude between a current longitude of the UAV and the longitude of the UAV at the first time point, real-time altitude-changing information indicating a difference of altitude between a current altitude of the UAV and the altitude of the UAV at the first time point, or real-time height-changing information indicating a difference of height between a current height of the UAV and the height of the UAV at the first time point.

Consistent with embodiments of the disclosure, for a UAV, different types of data packets can be broadcast during different time periods in the corresponding transmission session. In some embodiments, each transmission session can include a first time period, also referred to as a "time period of a first type" or a "type-I time period," and a second time period, also referred to as a "time period of a second type" or a "type-II time period." The first time period can be used for broadcasting the long data packet, and the second time period can be used for broadcasting the short data packet. For example, as shown in FIG. 1, each first transmission session 110 assigned to the special type UAVs for communication can include a first time period 112 and a second time period 114. Similarly, each second transmission session 120 assigned to the normal type UAVs for communication can include a first time period 122 and a second time period 124.

By using the timing relevance of the information, and the combination of the long data packets and the short data packets, the bandwidth requirement for broadcasting the information can be reduced. Table 1 below shows a comparison between the long data packet, i.e., the type-I data packet, and the short data packet, i.e., the type-II data packet.

TABLE 1

|  | Content | Size | Transmission time |
|---|---|---|---|
| Type-I data packet | Full monitoring data of a UAV | Relatively long | Within a type-I time period |
| Type-II data packet | Updating monitoring data of a UAV | Relatively short | Within a type-II time period |

As described above, the UAVs can be categorized into one type (or in other words the UAVs are not categorized). In this scenario, each TTI only includes one transmission session. Thus, the transmission sessions for the one category of UAVs include consecutive time periods. That is, a plurality of first time periods and a plurality of second time periods for one UAV are alternately arranged and consecutive to each other. In some other embodiments, the UAVs are categorized into multiple types, and each TTI includes two or more transmission sessions. Thus, the transmission sessions for one type of UAVs are not arranged consecutively. That is, each pair of first time period and second time period in one TTI are nonconsecutive to another pair of first time period and second time period in a neighboring TTI.

Further, in some embodiments, the first time period in each transmission session can include a plurality of first time slices, also referred to as "time slices of a first type" or "type-I time slices," and the second time period in each transmission session can include a plurality of second time slices, also referred to as "time slices of a second type" or "type-II time slices." In some embodiments, the long data packet can be broadcast during any one of the first time slices, and the short data packet can be broadcast during any one of the second time slices.

For example, as shown in FIG. 1, in each first transmission session 110 assigned to the special type UAVs for communication, the first time period 112 includes a number $M_{01}$ of first time slices 112-1, and the second time period 114 includes a number $M_{02}$ of second time slices 114-1. In each second transmission session 120 assigned to the normal type UAVs for communication, the first time period 122 includes a number $M_{11}$ of first time slices 122-1, and the second time period 124 includes a number $M_{12}$ of second time slices 124-1. Table 2 shows the time segment division as described in the example in connection with FIG. 1.

TABLE 2

| 1 TTI = H seconds = N × $T_S$ | | | |
|---|---|---|---|
| Special type UAV transmission session $N_0 × T_S$ | | Normal type UAV transmission session $N_1 × T_S$ | |
| Number of first time slices | Number of second time slices | Number of first time slices | Number of second time slices |
| $M_{01}$ | $M_{02}$ | $M_{11}$ | $M_{12}$ |

In some embodiments, each first time slice can include a first data transmission portion for transmitting a long data packet and a first gap portion for suspending information transmission. Each second time slice can include a second data transmission portion for transmitting a short data packet and a second gap portion for suspending information transmission. That is, during the first gap portion and the second gap portion, no information is broadcast. In this disclosure, the first data transmission portion is also referred to as a "data transmission portion of a first type" or a "type-I data transmission portion," the first gap portion is also referred to as a "gap portion of a first type" or a "type-I gap portion," the second data transmission portion is also referred to as a "data transmission portion of a second type" or a "type-II data transmission portion," and the second gap portion is also referred to as a "gap portion of a second type" or a "type-II gap portion." For example, as shown in FIG. 1, each first time slice 122-1 includes a first data transmission portion 122-3 and a first gap portion 122-5, and each second time slice 124-1 includes a second data transmission portion 124-3 and a second gap portion 124-5.

In some embodiments, each first time slice can include a number A of time units $T_S$, with A being a positive integer equal to or smaller than No. Similarly, each second time slice can include a number B of time units $T_S$, with B being a positive integer equal to or smaller than $N_1$. In some embodiments, the A time units $T_S$ in the first time slice can include a number $A_{data}$ of time units $T_S$ in the first data transmission portion and a number $A_{GI}$ of time units $T_S$ in the first gap portion, with $A_{data}$ and $A_{GI}$ being positive integers and $A = A_{data} A_{GI}$. Similarly, the B time units $T_S$ in the second time slice can include a number $B_{data}$ of time units $T_S$ in the second data transmission portion and a number $B_{GI}$ of time units $T_S$ in the second gap portion, with $B_{data}$ and $B_{GI}$ being positive integers and $B=B_{data}+B_{GI}$. The division of time slices is shown in Table 3 below.

TABLE 3

| Time slice | Total time length | Data transmission portion | Gap portion |
|---|---|---|---|
| First time slice | $A \times T_S$ | $A_{data} \times T_S$ | $A_{GI} \times T_S$ |
| Second time slice | $B \times T_S$ | $B_{data} \times T_S$ | $B_{GI} \times T_S$ |

The quantitative relationships between the parameters in the example shown in FIG. 1, Table 2, and Table 3 are summarized as follows:

$$N=N_0+N_1,$$

$$N_0=M_{01}\times A+M_{02}\times B,$$

$$N_1=M_{11}\times A+M_{12}\times B,$$

$$A=A_{data}+A_{GI},$$

$$B=B_{data}+B_{GI}. \quad (1)$$

According to the time division described above, the first data transmission portions and the first gap portions in the first time period are alternately arranged. That is, the first gap portions can separate neighboring first data transmission portions. Similarly, the second data transmission portions and the second gap portions in the second time period are alternately arranged, i.e., the second gap portions can separate neighboring second data transmission portions. Such a configuration can eliminate or reduce potential crosstalk between signals from different UAVs that are broadcast in adjacent data transmission portions, as described in more detail below.

In some embodiments, a monitoring station may monitor two or more UAVs. The distances of the UAVs to the monitoring station may be different, i.e., wave path differences may exist between different UAVs. Due to the wave path differences, signals broadcast by different UAVs at different times, e.g., in adjacent data transmission portions, may arrive at the monitoring station at the same time, causing the crosstalk.

For example, the monitoring station may monitor two UAVs, UAV1 and UAV2, that are at distances $D_1$ and $D_2$, respectively, away from the monitoring station (assuming $D_1 \leq D_2$), and thus the wave path difference between the two UAVs can be $d=D_1-D_2$. Thus, in order for a long data packet transmitted by UAV1 during a type-I data transmission portion to arrive at the monitoring station earlier than a long data packet transmitted by UAV2 during a subsequent type-I data transmission portion, the long data packet from UAV2 may need to be transmitted at a time later than d/c after the long data packet from UAV1 is transmitted, where c denotes the speed of light and is about $3\times10^8$ m/s. That is, the type-I gap portion, $A_{GI} \times T_S$, needs to be at least d/c. In other words, the type-I gap portion having a length of $A_{GI} \times T_S$ can allow UAVs having a wave path difference smaller than $d(A_{GI})=A_{GI}\times T_S \times c$ to be monitored by the same monitoring station without crosstalk between long data packets transmitted by the UAVs in adjacent type-I data transmission portions.

Similarly, the type-II gap portion having a length of $B_{GI} \times T_S$ can allow UAVs having a wave path difference smaller than $d(B_{GI})=B_{GI}\times T_S \times c$ to be monitored by the same monitoring station without crosstalk between short data packets transmitted by the UAVs in adjacent type-II data transmission portions. In this disclosure, $d(A_{GI})$ and $d(B_{GI})$ are also referred to as wave path differences that can be tolerated by the type-I gap portions and the type-II gap portions, respectively, and the equations for calculating these wave path differences can be summarized as follows:

$$d(A_{GI})=A_{GI}\times T_S \times c,$$

$$d(B_{GI})=B_{GI}\times T_S \times c. \quad (2)$$

Based on equations (2), the required time lengths of the type-I gap portions and the type-II gap portions for a given monitoring distance $d_{th}$ can be calculated as follows:

$$A_{GI}\times T_S \geq d_{th}/c,$$

$$B_{GI}\times T_S \geq d_{th}/c. \quad (3)$$

In this disclosure, the monitoring distance refers to a farthest distance of a UAV to the monitoring station that can avoid crosstalk between that UAV and another UAV at the location of the monitoring station.

Exemplary value ranges and/or quantitative relationships of the parameters described above are shown in Table 4 below:

TABLE 4

| Parameter | Description | Value range/ quantitative relationship | Note |
|---|---|---|---|
| H | Time length of one TTI | $0.2\ s \leq H \leq 2\ s$ | Information update time period (transmission time interval). |
| N | Number of time units $T_S$ in one TTI | $5 \times 10^3 \leq N \leq 20 \times 10^6$ | A monitoring system having a greater bandwidth requires a larger number of time units $T_S$ in one TTI. |
| $N_0$ | Number of time units $T_S$ assigned to special type UAVs | $0 \leq N_0 \leq N$ | $N_0 + N_1 = N$ |
| $N_1$ | Number of time units $T_S$ assigned to normal type UAVs | $0 \leq N_1 \leq N$ | |
| $M_{01}$ | Number of first time slices assigned to special type UAVs | $0 \leq M_{01} \leq 1000$ | $M_{01}, M_{02}, M_{11}, M_{12}, A, B$ satisfy equations (1). |
| $M_{02}$ | Number of second time slices assigned to special type UAVs | $0 \leq M_{02} \leq 1000$ | |
| $M_{11}$ | Number of first time slices assigned to normal type UAVs | $0 \leq M_{11} \leq 1000$ | |

TABLE 4-continued

| Parameter | Description | Value range/ quantitative relationship | Note |
|---|---|---|---|
| $M_{12}$ | Number of second time slices assigned to normal type UAVs | $0 \leq M_{12} \leq 1000$ | |
| A | Number of time units $T_S$ in one first time slice | $0.1 \times 10^{-3} \leq A \times H/N \leq 10 \times 10^{-3}$ | |
| B | Number of time units $T_S$ in one second time slice | $0.1 \times 10^{-3} \leq B \times H/N \leq 10 \times 10^{-3}$ | |
| $A_{data}$ | Number of time units $T_S$ in one first data transmission portion | $0.1 \times 10^{-3} s \leq A_{data} \times H/N \leq 10 \times 10^{-3} s$ | |
| $A_{GI}$ | Number of time units $T_S$ in one first gap portion | $10 \text{ km} \leq d(A_{GI}) = A_{GI} \times c \times H/N \leq 60 \text{ km}$ | The first gap portion is used for tolerating a certain wave path difference. A, $A_{data}$, $A_{GI}$ satisfy equations (1). |
| $B_{data}$ | Number of time units $T_S$ in one second data transmission portion | $0.1 \times 10^{-3} s \leq B_{data} \times H/N \leq 10 \times 10^{-3} s$ | |
| $B_{GI}$ | Number of time units $T_S$ in one second gap portion | $10 \text{ km} \leq d(B_{GI}) = B_{GI} \times c \times H/N \leq 60 \text{ km}$ | The second gap portion is used for tolerating a certain wave path difference. B, $B_{data}$, $B_{GI}$ satisfy equations (1). |

Figure 2:
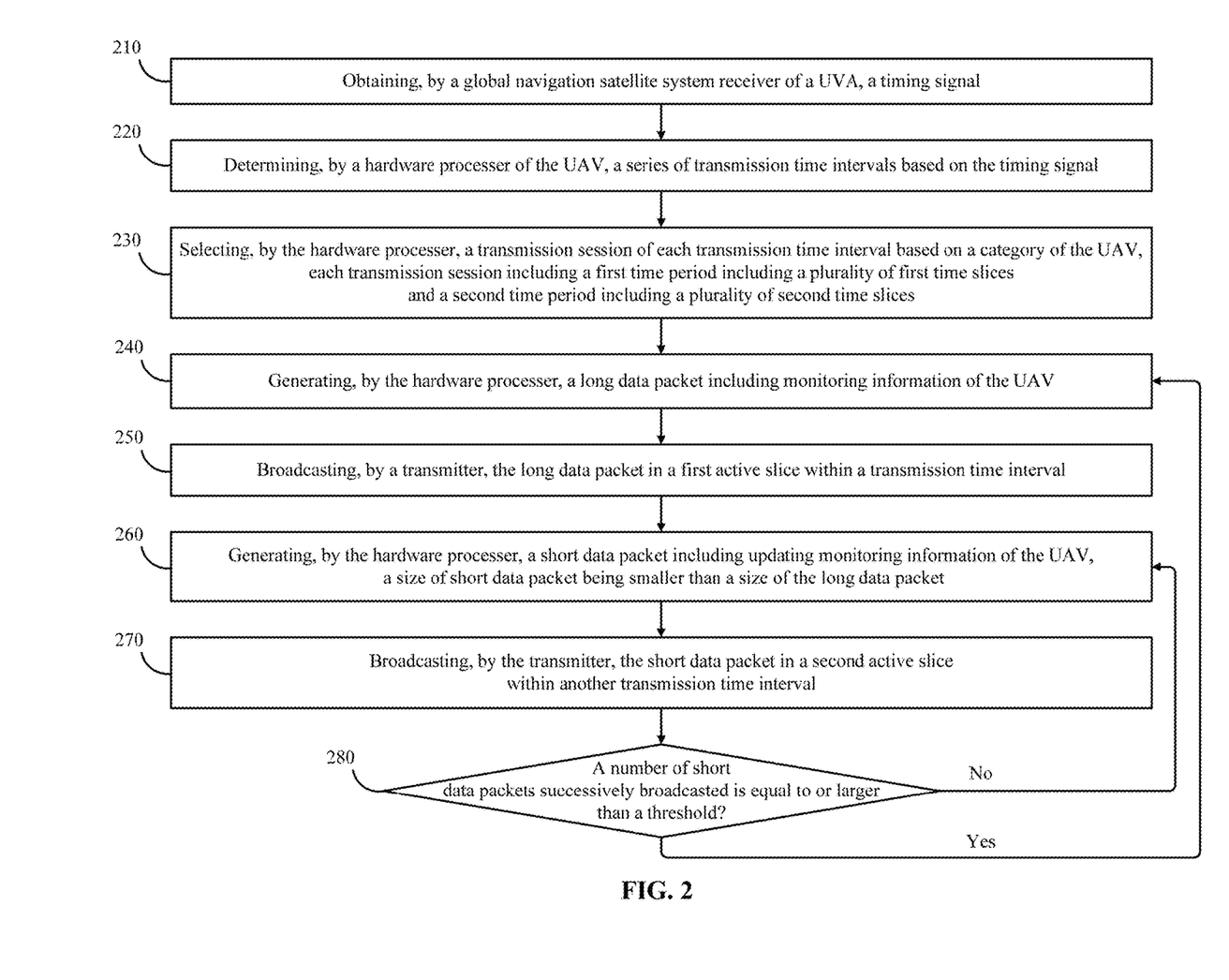
FIG. 2 illustrates a schematic flow chart of an exemplary process for an unmanned aerial vehicle to broadcast monitoring information in accordance with some embodiments of the disclosure.

FIG. 2 illustrates a schematic flow chart of an exemplary process for vehicle UAV to broadcast information in accordance with some embodiments of the disclosure.

As shown in FIG. 2, at 210, the UAV obtains at least one timing signal via a receiver associated with the UAV. The receiver can be, for example, a global navigation satellite system (GNSS). The GNSS receiver can be arranged at a location in or around the UAV, such as on the UAV. In some embodiments, the at least one timing signal can include at least one pulse signal transmitted by any suitable GNSS, such as the Global Positioning System (GPS), the Global'naya Navigatsionnaya Sputnikovaya Sistema (GLONASS), the Galileo positioning system, or the BeiDou Navigation Satellite System, etc.

According to the received at least one timing signal, a hardware processor of the UAV can determine a system time. A GNSS usually includes an atomic clock having a high accuracy, the at least one timing signal can be normally controlled within microsecond level. The system time of the UAV determined based on the received at least one timing signal can also have a high accuracy and can be synchronized to system times of other UAVs that are also determined based on timing signals from the GNSS.

At 220, a hardware processor of the UAV determines a series of TTIs based on the timing signal. In some embodiments, according to the system time determined at 210, the hardware process of the UAV can determine a transmission period including a plurality of TTIs. In some embodiments, the transmission period can include, for example, the time period from the beginning of a TTI for transmitting a long data packet to the beginning of a TTI for transmitting a next long data packet.

Since the system time of the UAV is synchronized to the system times of other UAVs, the boundaries of TTIs can be aligned for different UAVs. Therefore, in some embodiments, when a reference time for a transmission period is determined, the boundaries of the plurality of TTIs can be fixed. The reference time of the transmission period can be any suitable time point within the transmission period, such as a starting time of the transmission period, an ending time of the transmission period, or an intermediate time in the transmission period, etc.

In some embodiments, a starting time of the transmission period can be determined based on a number of TTIs in one transmission period and identity information of the UAV. For example, for a UAV having identity information UAV_ID, each transmission period can include a number X of TTIs. The starting time t of the Kth transmission period after the UAV took off can be calculated by: t=X×K+F (UAV_ID). The identity information UAV_ID can be a unique identifier such as an identification or a serial number of the UAV. F(.) can include a mapping function, such as a random mapping function.

In some embodiments, the number X of TTIs in one transmission period can be a fixed number for a UAV. In some other embodiments, the number X of TTIs in one transmission period can be determined based on a real-time speed of the UAV. A smaller X can correspond to a faster speed of the UAV, and a larger X can correspond to a lower speed of the UAV.

At 230, the processor selects a transmission session in each TTI for broadcasting information based on a category of the UAV. As described above, each transmission session can include a first time period including a plurality of first time slices, and a second time period including a plurality of second time slices.

As described above, each TTI can include multiple transmission sessions that are assigned to corresponding types of UAVs, respectively. For example, as shown in FIG. 1, each TTI includes a first transmission session assigned to special type UAVs for communication, and a second transmission session assigned to normal type UAVs for communication. Therefore, according to the type of the UAV, a corresponding transmission session in each TTI can be selected for the UAV for broadcasting information, such as the monitoring information. The unselected one or more transmission sessions can be left unused for the UAV. That is, the broadcasting of the monitoring information is suspended during the unselected one or more transmission sessions in each TTI.

At 240, the processor obtains a long data packet including monitoring information of the UAV. In some embodiments, the processor can obtain a data packet, e.g., the long data packet or a short data packet described below, by receiving or retrieving the data packet from another component of the UAV. In some embodiments, the processor can obtain the data packet by generating the data packet. As described above, the long data packet may include full monitoring data of the UAV at a time point. The full monitoring data of the UAV may include one or more of identity information of the UAV, security information of the UAV, platform information regarding the UAV, or any other suitable information of the UAV. The identity information of the UAV can be, for example, a unique identifier of the UAV such as a serial number of the UAV. The security information of the UAV can be, for example, a digital signature of the UAV.

In some embodiments, the platform information can include, for example, at least one of real-time attitude information indicating an attitude of the UAV or real-time location information indicating a position of the UAV. In some embodiments, the real-time location information may include, for example, at least one of real-time latitude information indicating a latitude of the UAV, real-time longitude information indicating a longitude of the UAV, real-time altitude information indicating an altitude of the UAV, or real-time height information indicating a height of the UAV.

At 250, a transmitter of the UAV broadcasts the long data packet in a first active slice within the transmission session of one of the TTIs.

Since the long data packet includes full monitoring data of the UAV at a time point, the long data packet can have a relatively large size, and can have a relatively low transmitting frequency. For example, in each transmission period including a number X of TTIs, the long data packet can be broadcast once within the selected transmission session in the first TTI of the transmission period.

In some embodiments, the first active slice is a first time slice randomly selected from the plurality of first time slices in the first time period in the selected transmission session in the first TTI of the transmission period. The long data packet can be broadcast within the first data transmission portion of the randomly selected first time slice, i.e., the first active slice.

Other first time slices in the first time period in the selected transmission session that are not selected can be referred to as inactive slices. That is, during the unselected first time slices, and during the first gap portion of the randomly selected first time slice, the broadcasting operation of the UAV can be suspended.

At 260, the processor obtains a short data packet including updating monitoring information of the UAV. As described above, the short data packet may include updating monitoring data of the UAV at another time point after the long data packet is broadcast. As described above, the updating monitoring data may indicate a change of monitoring data of the UAV between an earlier time point (the first time point) and a later time point (the second time point). For example, the updating monitoring data may indicate a change of monitoring data of the UAV based on the full monitoring data in the long data packet.

In some embodiments, the short data packet may include at least one of the identity information of the UAV, the security information of the UAV, updating platform information regarding the UAV, or any other suitable information of the UAV. The updating platform information may indicate a change of platform information of the UAV between the first time point and the second time point. In some embodiments, the updating platform information can include location-changing information, which may, for example, indicate a displacement of the UAV with respect to the position of the UAV at the first time point, such as the position of the UAV included in the long data packet.

As described above, the location-changing information may include at least one of real-time latitude-changing information, real-time longitude-changing information, real-time altitude-changing information, or real-time height-changing information. The real-time latitude-changing information indicates a change of latitude of the UAV with respect to a latitude of the UAV at the first time point, such as a difference between a current latitude of the UAV and the latitude included in the real-time location information in the long data packet. The real-time longitude-changing information indicates a change of longitude of the UAV with respect to a longitude of the UAV at the first time point, such as a difference between a current longitude of the UAV and the latitude included in the real-time location information. The real-time altitude-changing information indicates a change of altitude of the UAV with respect to an altitude of the UAV at the first time point, such as a difference between a current altitude of the UAV and the altitude included in the real-time location information. The real-time height-changing information indicates a change of height of the UAV with respect to a height of the UAV at the first time point, such as a difference between a current height of the UAV and the height included in the real-time location information.

At 270, the transmitter broadcasts the short data packet in a second active slice within the transmission session of another one of the TTIs, such as a TTI immediately following the TTI for broadcasting the long data packet.

Since the short data packet includes the updating monitoring data of the UAV, the short data packet can have a relatively small size, and can have a relatively high transmitting frequency. For example, in each transmission period including a number X of TTIs, a short data packet can be broadcast within the selected transmission session in each of the X−1 TTIs of the transmission period following the first TTI.

In some embodiments, the second active slice is a second time slice randomly selected from the plurality of second time slices in the second time period in the selected transmission session in the other one of the TTIs of the transmission period, such as the TTI immediately following the TTI for broadcasting the long data packet. The short data packet can be broadcast within the second data transmission portion of the randomly selected second time slice, i.e., the second active slice.

Other second time slices in the second time period in the selected transmission session that are not selected can be referred to as inactive slices. That is, during the unselected second time slices, and during the second gap portion of the randomly selected second time slice, the broadcasting operation of the UAV can be suspended.

At 280, the processor determines whether a number of short data packets successively broadcast is equal to or larger than a threshold. For example, as described above, the transmission period can include X TTIs and the threshold can be X−1.

In relating to determined that the number of short data packets successively broadcast is not equal to or larger than the threshold, the process returns to 260 to obtain another short data packet. For example, when the number of short data packets successively broadcast is less than X−1, it can be determined that the current transmission period has not finished. Thus, additional one or more short data packets may be obtained and broadcast in the following TTI(s).

In relating to determining that the number of short data packets successively broadcast is equal to or larger than the threshold, the process returns to 240 to obtain another long data packet. For example, when the number of short data packets successively broadcast equals X−1, it can be determined that the current transmission period has finished. Thus, a new transmission period can be started, and a new long data packet may be obtained and broadcast in the following TTI.

In some embodiments, the number X of TTIs in each transmission period can be a fixed number for the UAV. In some other embodiments, the number X of TTIs in one transmission period can be determined based on an expected speed of the UAV in a next transmission period. The expected speed of the UAV in the next transmission period can be estimated by using a real-time displacement calculated based on the location-changing information in the short data packets, and time differences between the short data packets. In some embodiments, the number X can be within a range from 1 to 20.

When the UAV has a fast expected speed, in order to obtain a more actuate location of the UAV, it may need to measure and broadcast the real-time location information of the UAV more frequently. Thus, the following transmission period may include a smaller number X That is, the ratio of the number of long data packets and the number of short data packets can be larger when the expected speed of the UAV is faster.

When the UAV has a slow expected speed, multiple displacements included in the successively broadcast short data packets may not accumulate an undesirable error, such that it may not need to measure and broadcast the real-time location information of the UAV too frequently. Thus, the following transmission period may include a larger number of X That is, the ratio of the number of long data packets and the number of short data packets can be smaller when the expected speed of the UAV is slower.

FIG. 2 is provided as an example only. The processes of the flow chart shown in FIG. 2 and described above can be executed or performed in any order or sequence not limited to the order and sequence shown in the figure and described above. Further, some of the above processes of the flow chart in FIG. 2 can be executed or performed substantially simultaneously where appropriate or in parallel to reduce latency and processing time, and one or more of the processes may be altogether omitted.

Figure 3:
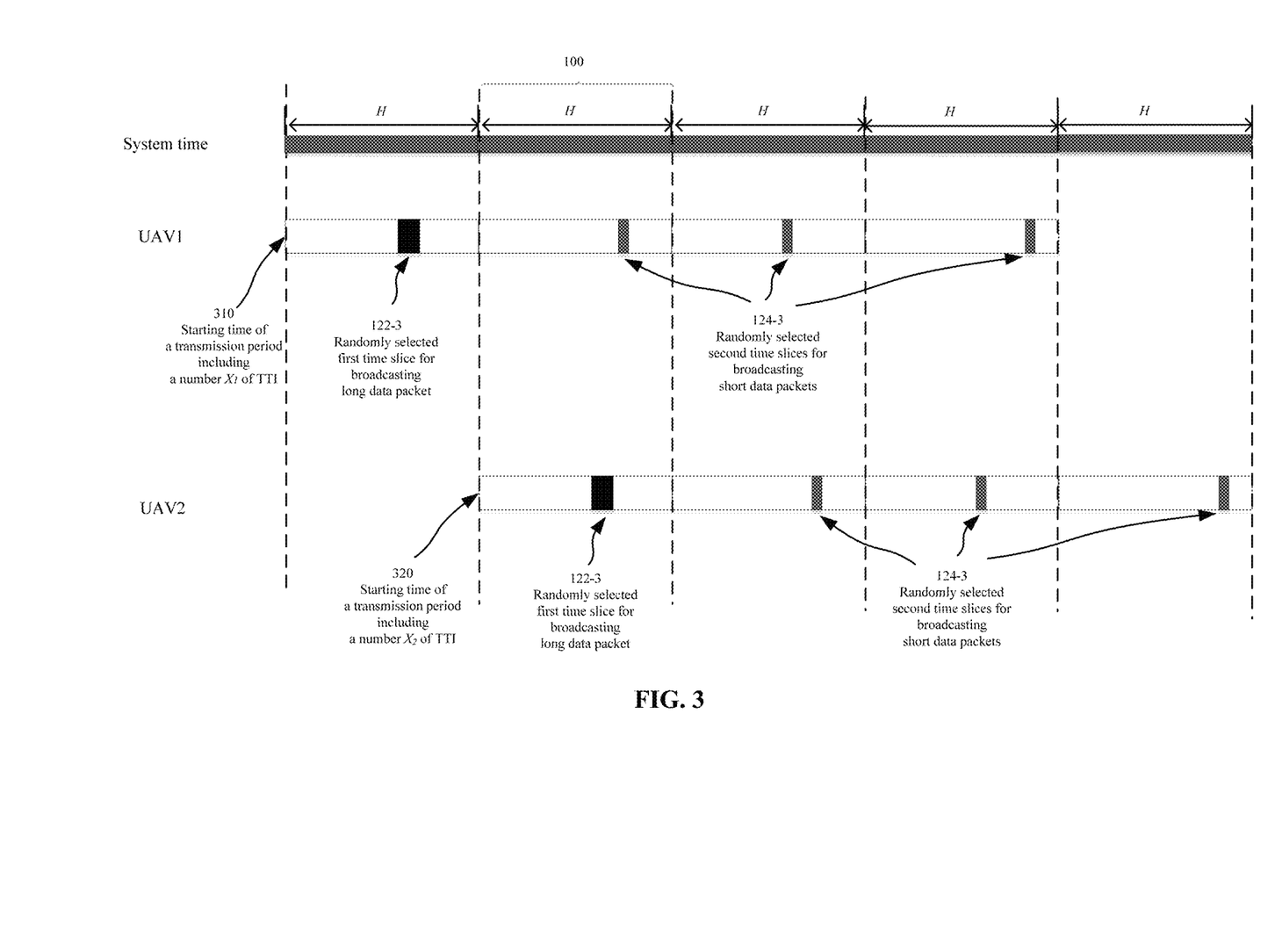
FIG. 3 illustrates a schematic time flow diagram of an exemplary process for broadcasting monitoring information by two unmanned aerial vehicles in accordance with some embodiments of the disclosure.

FIG. 3 illustrates a schematic time flow diagram of an exemplary process for broadcasting information by two UAVs, UAV1 and UAV2, in accordance with some embodiments of the disclosure.

As shown in FIG. 3, since the system times of the two unmanned aerial vehicles UAV1 and UAV2 are both synchronized to a GNSS time, UAV1 and UAV2 can share a plurality of TTIs 100. A transmission period for UAV1 can have a number $X_1$ of TTIs, with the first one of the $X_1$ TTIs used for broadcasting a long data packet containing full monitoring data of UAV1 and the remaining $X_1-1$ TTIs used for broadcasting short data packets containing updating monitoring data of UAV1. Similarly, a transmission period for UAV2 can have a number $X_2$ of TTIs, with the first one of the $X_2$ TTIs used for broadcasting a long data packet containing full monitoring data of UAV2 and the remaining $X_2-1$ TTIs used for broadcasting short data packets containing updating monitoring data of UAV2.

A starting time 310 of the transmission period of UAV1 can be the time boundary of the first TTI included in the transmission period of UAV1. In the first TTI of the transmission period, UAV1 can broadcast the long data packet within a randomly selected first time slice 312. In each of the remaining $X_1-1$ TTIs, UAV1 can broadcast a short data packet within a randomly selected second time slice 314.

Similarly, a starting time 320 of the transmission period of UAV2 can be the time boundary of the first TTI included in the transmission period of UAV2. In the first TTI of the transmission period, UAV2 can broadcast the long data packet within a randomly selected first time slice 322. In each of the remaining $X_2-1$ TTIs, UAV2 can broadcast a short data packet within a randomly selected second time slice 324.

The numbers of second time slices 314 and second time slices 324 shown in FIG. 3 are only exemplary. Further, the starting time 310 of the transmission period of UAV1 and the starting time 320 of the transmission period of UAV2 are also exemplary. The starting time 310 and the starting time 320 can be aligned with each other or be different from each other.

If UAV1 and UAV2 belong to different categories, i.e., a type of UAV1 is different from a type of UAV2, UAV1 and UAV2 will broadcast data packets in different transmission sessions in each TTI, and thus will not conflict with each other in broadcasting information.

If UAV1 and UAV2 belong to a same category or have a same type, UAV1 and UAV2 broadcast in a same transmission session in a TTI. In such case, there is certain probability that the broadcasting of UAV1 may conflict with the broadcasting of UAV1. However, such a conflict will not occur between a long data packet broadcast by UAV1 and a short data packet broadcast by UAV2 or between a short data packet broadcast by UAV1 and a long data packet broadcast by UAV2, because long data packets are only broadcast during the first time periods in the transmission sessions and short data packets are only broadcast during the second time periods in the transmission sessions.

Further, if the starting time 310 of the transmission period of UAV1 and the starting time 320 of the transmission period of UAV2 do not align with each other, i.e., if they are not the same, broadcasting of the long data packet by UAV1 will not conflict with broadcasting of the long data packet by UAV2, because the long data packets are only broadcast within the first TTIs of the corresponding transmission periods.

In the following, a broadcasting conflict analysis consistent with embodiments of the disclosure is described. In below, a system that includes a number W of UAVs having a same type are considered. The transmission period of each of the W UAVs includes X TTIs, and the starting times of the number of W of UAVs are evenly distributed. The probabilities that the broadcasting of one of the W UAVs, referred to as a "local UAV," conflicts with other ones of the W UAVs are calculated.

As described above, if two UAVs have different starting times of their transmission periods, the long data packets of the two UAVs are broadcast in different TTIs and do not conflict with each other. In the system having a transmission period including X TTIs, a probability that another UAV has the same starting time of transmission period as the local UAV is 1/X. Thus, a probability that a number L of UAVs in the W−1 UAVs have the same starting time of transmission period as the local UAV is $$p(L) = C_{W-1}^{L} \left(\frac{1}{X}\right)^L \left(1 - \frac{1}{X}\right)^{(W-1-L)}. \tag{4}$$

Assume that the first time period in each TTI includes a number $M_{11}$ of first time slices, then a probability that another UAV selects the same first time slice for broadcasting as the local UAV is $$\frac{1}{M_{11}}.$$

Thus, for L UAVs among the remaining W−1 UAVs that have the same starting time of transmission period as the local UAV, a probability that the broadcasting of a long data packet by the local UAV does not conflict with the broadcasting of a long data packets by the L UAVs is $$\left(1 - \frac{1}{M_{11}}\right)^L.$$

Accordingly, in the system including the W UAVs, a non-conflict probability that the broadcasting of a long data packet by the local UAV does not conflict with the broadcasting of a long data packets of all other UAVs is $$p_{no-c}^I = \sum_{L=0}^{W-1} C_{W-1}^L \left(\frac{1}{X}\right)^L \left(1 - \frac{1}{X}\right)^{(W-1-L)} \left(1 - \frac{1}{M_{11}}\right)^L. \quad (5)$$

By using equation (5), the number of first time slices, $M_{11}$, in the first time period of each TTI that satisfies a condition $p_{no-c}^I = p_{th}^I$ can be determined, where $p_{th}^I$ is a non-conflict probability threshold, e.g., a desired non-conflict probability, for the long data packet broadcasting.

For each of the W UAVs, X−1 of the X TTIs in the transmission period are used for broadcasting short data packets. Therefore, for a given TTI that is used by the local UAV to broadcast a short data packet, a probability that another UAV also broadcasts a short data packet in this TTI is (X−1)/X=(1−1/X). Thus, a probability that a number L of UAVs in the remaining W−1 UAVs also broadcast a short data packet in this TTI is $$p^{II} = C_{W-1}^L \left(1 - \frac{1}{X}\right)^L \left(\frac{1}{X}\right)^{(W-1-L)}. \quad (6)$$

Assume that the second transmission period in each TTI includes a number $M_{12}$ of second time slices, then a probability that another UAV selects the same second time slice as the local UAV for broadcasting a short data packet is $$1 - \frac{1}{M_{12}}.$$

Thus, for L UAVs among the remaining W−1 UAVs that broadcast a short data packet in this TTI, a probability that the broadcasting of a short data packet by the local UAV does not conflict with the broadcasting of a short data packets by the L UAVs is $$\left(1 - \frac{1}{M_{12}}\right)^L.$$

Accordingly, in the system including the W UAVs, a non-conflict probability that the broadcasting of a short data packet by the local UAV does not conflict with the broadcasting of a short data packets of all other UAVs is $$p_{no-c}^{II} = \sum_{L=0}^{W-1} C_{W-1}^L \left(1 - \frac{1}{X}\right)^L \left(\frac{1}{X}\right)^{(W-1-L)} \left(1 - \frac{1}{M_{12}}\right)^L. \quad (7)$$

By using equation (7), the number of second time slices, $M_{12}$, in the second time period of each TTI that satisfies a condition $p_{no-c}^{II} = p_{th}^{II}$ can be determined, where $p_{th}^I$ is a non-conflict probability threshold, e.g., a desired non-conflict probability, for the short data packet broadcasting.

Figure 4:
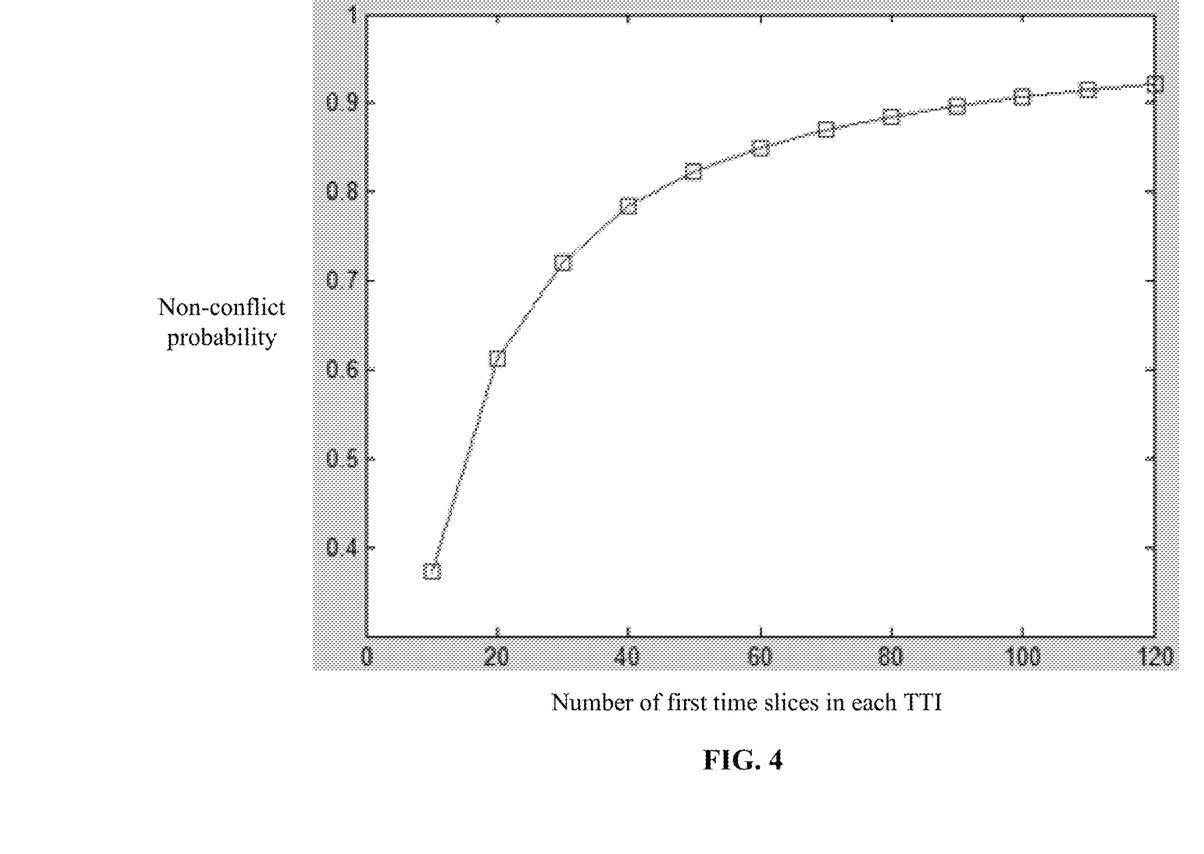
FIGS. 4 and 5 illustrate schematic simulation diagrams of exemplary non-conflict probabilities based on different parameters in accordance with some embodiments of the disclosure.
Figure 5:
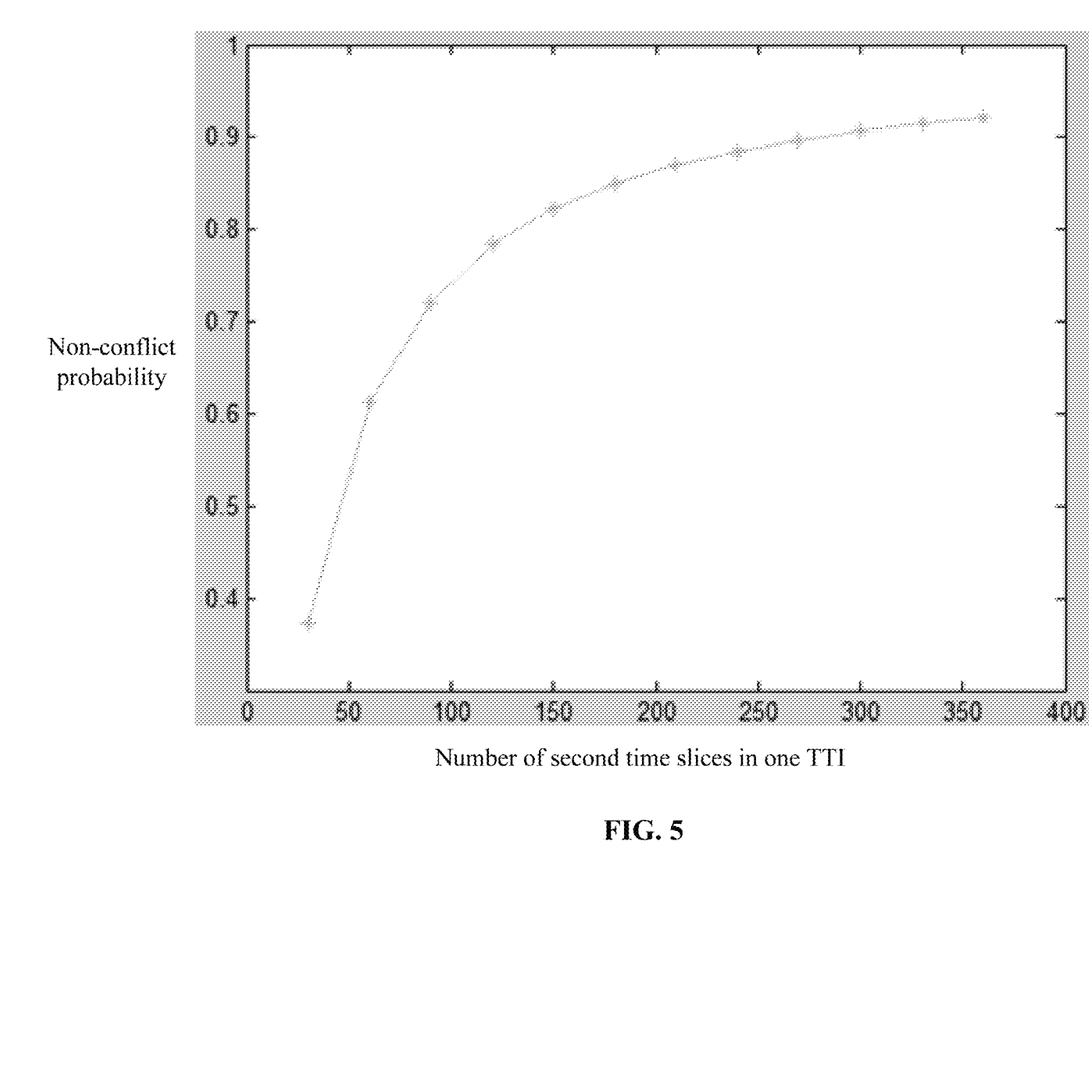

FIGS. 4 and 5 illustrate schematic simulation diagrams of exemplary non-conflict probabilities based on different parameters in accordance with some embodiments of the disclosure. In the examples shown in FIGS. 4 and 5, the number W of UAVs in the system is four and the number X of TTIs in each transmission period of all the UAVs is forty.

The curve in FIG. 4 shows the non-conflict probability $p_{no-c}^I$ for long data packet broadcasting versus the number of first time slices $M_{11}$ in the first time period of each TTI. As illustrated, the non-conflict probability $p_{no-c}^I$ for long data packet broadcasting increases when the number of first time slices $M_{11}$ in the first time period of each TTI increases.

In order to satisfy the non-conflict probability threshold $p_{th}^I$ for the long data packet broadcasting, i.e., in order that $p_{no-c}^I \geq p_{th}^I$, the number of first time slices $M_{11}$ in the first time period of each TTI needs to be large than or equal to a first threshold $M_{11}^{th}$:

$$M_{11}^{th} = \quad (8)$$

$$\min\left\{M_{11} \in Z^+ : \sum_{L=0}^{W-1} C_{W-1}^L \left(\frac{1}{X}\right)^L \left(1 - \frac{1}{X}\right)^{(W-1-L)} \left(1 - \frac{1}{M_{11}}\right)^L \geq p_{th}^I \right\}.$$

Similarly, the curve in FIG. 5 shows the non-conflict probability $p_{no-c}^{II}$ for short data packet broadcasting versus the number of second time slices $M_{12}$ in the second time period of each TTI. As illustrated, the non-conflict probability $p_{no-c}^{II}$ for short data packet broadcasting increases when the number of second time slices $M_{12}$ in the second time period of each TTI increases.

In order to satisfy the non-conflict probability threshold $p_{th}^{II}$, for the short data packet broadcasting, i.e., in order that $p_{no-c}^{II} \geq p_{th}^{II}$, the number of second time slices $M_{12}$ in the first time period of each TTI needs to be large than or equal to a second threshold $$M_{12}^{th} = \quad (9)$$

$$\min\left\{M_{12} \in Z^+ : \sum_{L=0}^{N-1} C_{W-1}^L \left(1 - \frac{1}{X}\right)^L \left(\frac{1}{X}\right)^{(W-1-L)} \left(1 - \frac{1}{M_{12}}\right)^L \geq p_{th}^{II} \right\}.$$

Figure 6:
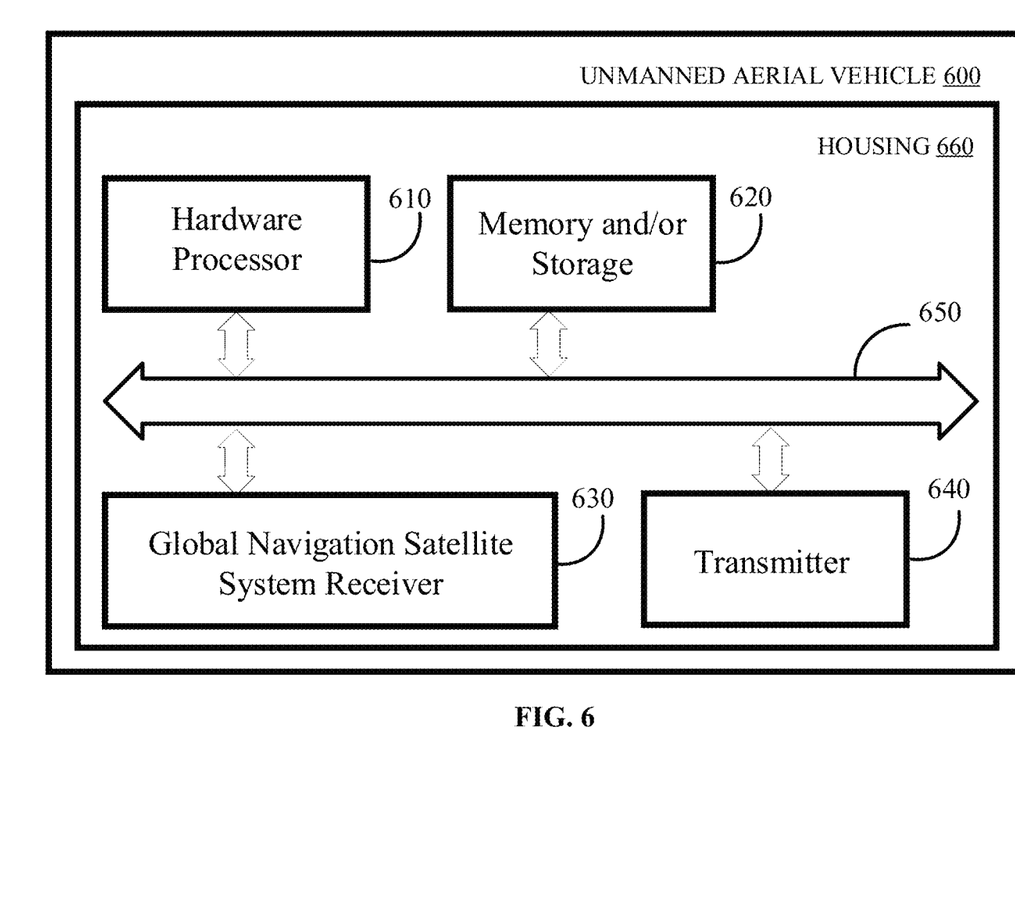
FIG. 6 illustrates a schematic structural diagram of an exemplary unmanned aerial vehicle for broadcasting monitoring information in accordance with some embodiments of the disclosure.

FIG. 6 illustrates a schematic structural diagram of an exemplary UAV 600 in accordance with some embodiments of the disclosure. As shown in FIG. 6, the UAV 600 includes a hardware processor 610, a memory and/or storage 620, a GNSS receiver 630, and a transmitter 640. In some embodiments, the UAV 600 may further include an input signal receiver, a power system, a flight control system, a communication interface, a bus (e.g., bus 650), one or more cameras, and/or any other suitable components. Further, as shown in FIG. 6, the UAV 600 also includes a housing 660 for accommodating the components of the UAV 600.

In some embodiments, the UAV 600 can be controlled by a remote control. The remote control can be a specific remote control device for the UAV 600, or can be a software application implemented on a mobile smart device, such as a smartphone, a tablet computer, etc.

The hardware processor 610 can include any suitable hardware processor, such as a microprocessor, a microcontroller, a central processing unit (CPU), a network processor (NP), a digital signal processor (DSP), an application specific integrated circuit (ASIC), a field-programmable gate array (FPGA), or another programmable logic device, discrete gate or transistor logic device, discrete hardware component. The hardware processor 610 is configured to implement or execute part or all of a method consistent with the disclosure, such as one of the exemplary methods for broadcasting information described above.

The memory and/or storage 620 can be any suitable memory and/or storage for storing programs, data, instructions, information of UAV, long data packets, short data packets, and/or any other suitable content in some embodiments. For example, the memory and/or storage 620 can include a random access memory (RAM), read only memory, flash memory, non-volatile memory, such as hard disk storage, optical media, and/or any other suitable storage device. In some embodiments, the memory and/or storage 620 includes a non-transitory computer-readable storage medium storing instructions that, when executed by the hardware processor 610, cause the hardware processor 610 to perform a method consistent with the disclosure, such as one of the exemplary methods for broadcasting information described above.

The GNSS receiver 630 can be any suitable receiver configured to receive timing signals from a satellite of a global navigation satellite system. In some embodiments, the GNSS receiver 630 can include at least one of a GPS receiver, a GLONASS receiver, a Galileo positioning system receiver, or a BeiDou Navigation Satellite System receiver.

The transmitter 640 can be configured to wirelessly broadcast information of the UAV 600. For example, the transmitter 640 can generate wireless signals based on the long data packets and short data packets described above. The wireless signals can be any suitable signals that can carry information and propagate in a free space, such as infrared signals, radio signals, radar signals, optical signals, sonic signals, WiFi signals, cellular data signals, mobile satellite signals, etc.

In some embodiments, the transmitter 640 can include any suitable circuitry for interfacing with one or more wireless communication networks. For example, the transmitter 640 can include a wireless network interface card circuitry, a wireless communication circuitry, an antenna, and/or any other suitable circuitry for interfacing with one or more wireless communication networks, such as the Internet, a Wi-Fi network, a BlueTooth network, a cellular data network, a mobile satellite network, a HiperLAN network, a wide area network, a local network, a metropolitan area network, etc.

In some embodiments, the wireless communication network can be any suitable combination of one or more wireless networks such as a wireless personal area network (WPAN), a wireless local area network (WLAN), a wireless ad hoc network, a wireless metropolitan area network (WMAN), a wireless wide area network (WWAN), a global area network (GAN), a Wi-Fi network, a WiMax network, a satellite network, a mobile phone network, a mobile data network, and/or any other suitable communication network, or any combination of any of such networks.

In some embodiments, the process of the disclosed method in various embodiments can be directly executed by a hardware decoding processor, or by a decoding processor including a hardware module and a software module. The software module may reside in any suitable storage/memory medium, such as a random access memory, a flash memory, a read-only memory, a programmable read-only memory, an electrically erasable programmable memory, a register, etc. The storage medium can be located in the memory and/or storage 620. The hardware processor 610 can implement the processes of the disclosed method by using the hardware and the information read from the memory and/or storage 620.

Accordingly, methods, systems, and media for broadcasting information are provided. The disclosed methods, systems, and media for broadcasting information can be used for surveillance of multiple UAVs. However, the methods can also be generalized to any other suitable system including multiple mobile platforms.

The flowcharts and blocks in the figures may illustrate various embodiments of the disclosed methods and systems, as well as architectures, functions and operations that can be implemented by a computer program product. In this case, each block of the flowcharts or block diagrams may represent a module, a code segment, a portion of program code. Each module, each code segment, and each portion of program code can include one or more executable instructions for implementing predetermined logical functions.

It is also noted that, each block in the block diagrams and/or flowcharts, as well as the combinations of the blocks in the block diagrams and/or flowcharts, can be realized by a dedicated hardware-based system for executing specific functions, or can be realized by a dedicated system including hardware and computer instructions.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Further, it is understood that the present disclosure has been made only by way of example, and that numerous changes in the details of embodiment of the disclosure can be made without departing from the spirit and scope of the disclosure. Features of the disclosed embodiments can be combined and rearranged in various ways. Without departing from the spirit and scope of the disclosure, modifications, equivalents, or improvements to the disclosure are understandable to those skilled in the art and are intended to be encompassed within the scope of the present disclosure. It should be noted that, similar reference numerals and letters are refer to similar items in the figures, and thus once an item is defined in one figure, there is no need to further define and/or explain the item in subsequent figures.

What is claimed is:

1. A monitoring information broadcasting method, comprising:
   determining, by a hardware processer, a series of transmission sessions aligned to a system time of a mobile platform, each transmission session including a first time period and a second time period, the first time period including a plurality of first time slices, and the second time period including a plurality of second time slices; and
   performing one of:
      broadcasting, by a transmitter mounted on the mobile platform, a data packet of a first type during a first active slice among the first time slices in the first time period of one of the transmission sessions; or
      broadcasting, by the transmitter, a data packet of a second type during a second active slice among the second time slices in the second time period of the one of the transmission sessions.

2. The method of claim 1, wherein the transmission sessions are within designated time periods for broadcasting monitoring data, the designated time periods being nonconsecutive and determined by a category of the mobile platform.

3. The method of claim 1, further comprising:
   suspending, in relating to broadcasting the data packet of the first type, broadcasting during inactive ones of the first time slices in the first time period of the one of the transmission sessions and during the second time period of the one of the transmission sessions.

4. The method of claim 3, further comprising:
   randomly selecting the first active slice from the first time slices in the first time period of the one of the transmission sessions.

5. The method of claim 4, wherein randomly selecting the first active slice from the first time slices includes determining the first active slice from the first time slices in the first time period of the one of the transmission sessions using a random selection process based on a unique identifier associated with the mobile platform.

6. The method of claim 5, wherein the unique identifier includes at least one of an identification of the mobile platform or a serial number of the mobile platform.

7. The method of claim 1, further comprising:
   suspending, in relating to broadcasting the data packet of the second type, broadcasting during the first time period of the one of the transmission sessions and during inactive ones of the second time slices in the second time period of the one of the transmission sessions.

8. The method of claim 7, further comprising:
   randomly selecting the second active slice from the second time slices in the second time period of the one of the transmission sessions.

9. The method of claim 1, further comprising:
   obtaining, via a receiver on the mobile platform, a timing signal; and
   determining, by the hardware processor, the system time according to the timing signal.

10. The method of claim 9, wherein determining the system time includes synchronizing the system time of the mobile platform with a system time of at least another mobile platform.

11. The method of claim 1, wherein:
    each of at least two of the transmission sessions has a time range from about 0.2 s to about 2 s,
    each of at least two of the first time slices has a time range from about 0.1 ms to about 10 ms,
    each of at least two of the second time slices has a time range from about 0.1 ms to about 10 ms, and
    at least one of the first time slices is longer than at least one of the second time slices.

12. The method of claim 1, wherein:
    each of the first time slices includes a data transmission portion for information transmission and a gap portion for suspending information transmission, and
    broadcasting the data packet of the first type during the first active slice includes broadcasting the data packet of the first type during the data transmission portion of the first active slice.

13. The method of claim 1, wherein:
    each of the second time slices includes a data transmission portion for information transmission and a gap portion for suspending information transmission, and
    broadcasting the data packet of the second type during the second active slice includes broadcasting the data packet of the second type during the data transmission portion of the second active slice.

14. The method of claim 1, further comprising:
    determining, by the hardware processor, a reference time for a transmission period including the one of the transmission sessions.

15. The method of claim 14, wherein determining the reference time for the transmission period includes determining a starting time of the transmission period.

16. The method of claim 1, wherein the data packet of the first type contains monitoring data of the mobile platform.

17. The method of claim 1, wherein the data packet of the second type contains updating monitoring data of the mobile platform, the updating monitoring data indicating a change of monitoring data of the mobile platform between a first time point when or before a last data packet is broadcast and a second time point when or before the data packet of the second type is broadcast but after the last data packet is broadcast.

18. A monitoring information broadcasting device, comprising:
    a hardware processor;
    a memory storing program codes that, when executed by the hardware processor, cause the hardware processor to:
       determine a series of transmission sessions aligned to a system time of a mobile platform, each transmission session including a first time period and a second time period, the first time period including a plurality of first time slices, and the second time period including a plurality of second time slices, and
       generate an instruction for broadcasting information during the transmission sessions, the instruction instructing to broadcast:
          a data packet of a first type during a first active slice among the first time slices in the first time period of one of the transmission sessions, or
          a data packet of a second type during a second active slice among the second time slices in the second time period of the one of the transmission sessions; and
    a transmitter configured to broadcast information according to the instruction.

19. A monitoring information broadcasting method comprising:
    determining, by a hardware processor, a system time for a mobile platform according to a timing signal;

determining, by the hardware processor, a series of transmission sessions aligned to the system time, each transmission session including a first time period and a second time period, the first time period including a plurality of first time slices, and the second time period including a plurality of second time slices;

broadcasting, by a transmitter mounted on the mobile platform, a data packet of a first type during a first active slice of the first time slices in the first time period of a first one of the transmission sessions;

broadcasting, by the transmitter, a data packet of a second type during a second active slice of the second time slices in the second time period of a second one of the transmission sessions; and suspending broadcasting during inactive ones of the first time slices in the first time period of the first one of the transmission sessions, the second time period of the first one of the transmission sessions, the first time period of the second one of the transmission sessions, and inactive ones of the second time slices in the second time period of the second one of the transmission sessions.

20. The method of claim 19,
wherein:
the data packet of the first type is one of two successively-broadcast data packets of the first type, and
the data packet of the second type is broadcast between the two successively-broadcast data packets of the first type,
the method further comprising:
broadcasting, by the transmitter, between broadcasting the two successively-broadcast data packets of the first type, another data packet of the second type during a third active slice of the second time period of a third one of the transmission sessions.

* * * * *